(12) United States Patent
Glynn et al.

(10) Patent No.: US 6,206,638 B1
(45) Date of Patent: Mar. 27, 2001

(54) LOW COST AIRFOIL COOLING CIRCUIT WITH SIDEWALL IMPINGEMENT COOLING CHAMBERS

(75) Inventors: Christopher C. Glynn, Hamilton; Paul S. Wilson, Cincinnati; James A. Martus, Cincinnati; Clay K. Carlson, Cincinnati, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/249,204

(22) Filed: Feb. 12, 1999

(51) Int. Cl.[7] .................................................. F01D 5/18
(52) U.S. Cl. ...................... 416/97 R; 416/96 R; 415/115
(58) Field of Search .......................... 415/115; 416/97 R, 416/96 R, 96 A, 97 A (56) References Cited

U.S. PATENT DOCUMENTS

| | | | |
|---|---|---|---|
| 4,297,077 | * 10/1981 | Durgin et al. | 416/97 R |
| 4,767,268 | * 8/1988 | Auxier et al. | 416/97 R |
| 4,770,608 | 9/1988 | Anderson et al. | 416/97 R |
| 5,156,526 | * 10/1992 | Lee et al. | 416/97 R |
| 5,387,086 | 2/1995 | Frey et al. | 416/97 R |
| 5,431,537 | 7/1995 | Sturm | 416/97 R |
| 5,498,132 | 3/1996 | Carozza et al. | 416/97 R |
| 5,498,133 | 3/1996 | Lee | 416/97 R |
| 5,660,524 | 8/1997 | Lee et al. | 416/97 R |
| 5,702,232 | 12/1997 | Moore | 416/97 R |
| 5,813,836 | 9/1998 | Starkweather | 416/97 R |
| 5,820,337 | 10/1998 | Jackson et al. | 416/97 R |
| 5,993,156 | * 11/1999 | Bailly et al. | 416/97 R |

FOREIGN PATENT DOCUMENTS 60-135606  7/1985 (JP).

* cited by examiner

Primary Examiner—Edward K. Look
Assistant Examiner—Richard Woo
(74) Attorney, Agent, or Firm—Andrew C. Hess; Rodney M. Young (57) ABSTRACT

A gas turbine engine airfoil includes an airfoil outer wall having widthwise spaced apart pressure and suction sidewall sections extending chordally between leading and trailing edges of the airfoil and extending longitudinally from a base to a tip. Inside the airfoil is at least one internal cooling circuit having a plurality of longitudinally extending circuit channels between longitudinally extending internal ribs extending widthwise between the pressure and suction sidewall sections and a longitudinally extending first sidewall film cooling chamber positioned between one of the sidewall sections and a first inner wall bounding the cooling circuit. Sidewall film cooling holes extend through the pressure sidewall section from the first sidewall film cooling chamber. The internal ribs have corresponding rib angles with respect to a centerline, the first inner wall has a corresponding first wall angle with respect to the centerline, and each of the rib angles and the first wall angle are constant in a longitudinal direction from the base to the tip. In the preferred embodiment, all the inner walls are substantially parallel to each other and all the transverse ribs are substantially parallel to each other or are substantially parallel to the first and second inner walls.

30 Claims, 11 Drawing Sheets

LOW COST AIRFOIL COOLING CIRCUIT WITH SIDEWALL IMPINGEMENT COOLING CHAMBERS

BACKGROUND OF THE INVENTION

1. Field of the Invention

The present invention relates generally to cooling air circuits of turbine rotor blades and stator vanes in gas turbine engines and, more specifically, to serpentine cooling circuits feeding cooling air to sidewall impingement cooling chambers and which blades are castable with a single pull core.

2. Discussion of the Background Art

A gas turbine engine includes a compressor that compresses air which is channeled to a combustor wherein it is mixed with fuel and ignited for generating combustion gases. The combustion gases flow downstream through one or more stages of turbines which extract energy therefrom for powering the compressor and producing additional output power for driving a fan for powering an aircraft in flight for example. A turbine stage includes a row of turbine rotor blades secured to the outer perimeter of a rotor disk, with a stationary turbine nozzle having a plurality of stator vanes disposed upstream therefrom. The combustion gases flow between the stator vanes and between the turbine blades for extracting energy to rotate the rotor disk. The temperatures within gas turbines may exceed 2500 degrees Fahrenheit, and cooling of turbine blades is very important in terms of blade longevity. Without cooling, turbine blades would rapidly deteriorate. Improved cooling for turbine blades is very desirable, and much effort has been devoted by those skilled in the blade cooling arts to devise improved geometries for the internal cavities within turbine blades in order to enhance cooling. Since the combustion gases are hot, the turbine vanes and blades are typically cooled with a portion of compressor air bled from the compressor for this purpose. Diverting any portion of the compressor air necessarily decreases the overall efficiency of the engine. Accordingly, it is desired to cool the vanes and blades with as little compressor bleed air as possible.

Typical turbine vanes and blades include an airfoil over which the combustion gases flow. The airfoil typically includes one or more serpentine cooling passages therein through which the compressor bleed air is channeled for cooling the airfoil. The airfoil may include various turbulators therein for enhancing cooling effectiveness and, the cooling air is discharged from the passages through various film cooling holes disposed around the outer surface of the airfoil.

Typical mid-circuit cooling air, after picking up the heat in the serpentine passage, exits through film cooling holes. One or more rows of film cooling holes are placed on the pressure and suction sides. New highly aerodynamically efficient airfoils in low through flow turbine designs are subject to an external gas path flow along the pressure side that has low velocity. This can result in a very high blowing ratio (mass flux ratio of film cooling air to gas flow) through the film cooling holes and very poor film cooling effectiveness (film blow-off) on the pressure side of the airfoil. Geometrical limitations of at least some of the cavities which supply the film cooling air prevent or make difficult the use of film holes on both pressure and suction sides that have relatively shallow angles from the surfaces of the sides. The use of larger angles would result in significant aerodynamic mixing losses and poor film cooling effectiveness because much of the film cooling air would flow out of the boundary layer. Therefore, it is desirable to have a circuit design which can avoid the use of film cooling in such areas of the airfoil and provide effective and efficient film and convective cooling of the entire airfoil.

U.S. Pat. No. 5,660,524, entitled "Airfoil Blade Having A Serpentine Cooling Circuit And Impingement Cooling", discloses an airfoil blade, such as a jet engine turbine rotor blade with an internal serpentine coolant circuit that has a last downstream passageway bounded by four monolithic inner walls which are monolithic with at least a portion of the outer walls. Two of the inner walls are spaced from the outer walls and contain air impingement orifices creating two film cooling chambers. Some coolant in the serpentine circuit exits the airfoil blade through a coolant exit in the blade tip. The remaining coolant in the circuit passes through the impingement orifices and exits the blade through film cooling holes in the outer walls.

U.S. Pat. No. 5,813,836, entitled "Turbine Blade", discloses an airfoil having a double-wall construction for side-wall impingement cooling on the pressure side and a forward flowing multi-pass serpentine cooling air circuit along the suction side of the blade which flows cooling air forward with respect to the aft flowing hot gases through the turbine. The airfoil also includes a leading edge cavity having a plurality of radial film cooling holes supplied by the three pass serpentine cooling circuit. As cooling air flows along the passageways, it convectively cools the portions of the turbine blade adjacent these passageways. The airfoil further includes a trailing edge cavity to cool the trailing edge flow region of the airfoil. A plurality of impingement cavities are located on the pressure sidewall section and impingement holes provide cooling air from the serpentine passageways of the inner cavity and the impingement cavities. Multi-row, compound angle film holes extend from the impingement cavities so that cooling air from the impingement cavities can be discharged from the airfoil.

Known turbine airfoil cooling techniques include the use of internal passages forming a serpentine cooling circuit. Particularly, serpentine passages, leading edge impingement bridges, film holes, pin fins, and trailing edge holes or pressure side bleed slots are utilized for blade cooling. It would be desirable to provide improved blade cooling. In providing even better blade cooling, it is also desirable to avoid significantly increasing the blade fabrication costs. Casting of the blades involves the use of a ceramic core around which the blade is cast. This core is then leached out leaving behind an air flow passage and the internal surface configuration. The core itself is formed by injecting slurry into a mold formed by dies. The dies must then be opened to obtain the core. Some shapes require multiple pull dies because of the complex configuration. It is preferable to minimize the number of dies used and with as few pulls as possible. It is highly desirable to have only two dies surrounding the airfoil with a single pull require to release the core. It is also highly desirable to have a single piece core to improve the quality and accuracy of the casting process and internal passages and cavities of the hollow airfoil.

SUMMARY OF THE INVENTION

A gas turbine engine airfoil for a vane or a blade includes an airfoil outer wall having widthwise spaced apart pressure and suction sidewall sections extending chordally between leading and trailing edges of the airfoil and extending longitudinally from a base to a tip. inside the airfoil is at least one internal cooling circuit having a plurality of longitudinally extending circuit channels between longitudinally extending internal ribs extending widthwise between the pressure and suction sidewall sections and a longitudinally extending first sidewall film cooling chamber positioned between one of the sidewall sections and a first inner wall bounding the cooling circuit. A first plurality of sidewall film cooling holes extend through the pressure sidewall section from the first sidewall film cooling chamber. The internal ribs have corresponding rib angles with respect to a centerline, the first inner wall has a corresponding first wall angle with respect to the centerline, and each of the rib angles and the first wall angle are constant in a longitudinal direction from the base to the tip.

A first exemplary embodiment includes a plurality of first impingement cooling apertures extending from at least a first one of the circuit channels through the first inner wall to the internal cooling circuit. In the preferred embodiment, all the inner walls are substantially parallel to each other and all the transverse ribs are substantially parallel to each other or are substantially parallel to the first and second inner walls. Other embodiments of the present invention may include the first sidewall film cooling chamber being triangular in cross-section and the first sidewall film cooling chamber segmented into compartments with shelves extending cross-sectionally entirely across the first sidewall film cooling chamber between each of the compartments. The internal cooling circuit may be a serpentine cooling circuit.

In one embodiment, the first impingement cooling apertures are located along an interior corner of the first sidewall film cooling chamber and, in another embodiment, the first impingement cooling apertures are arranged in a staggered array in at least two longitudinally extending rows such that the first impingement cooling apertures are centered along a single zig-zag line.

Another embodiment of the present invention has no impingement cooling apertures extending through the first inner wall and has a metering inlet at a radially inner base of the airfoil for supplying all cooling air to the first sidewall film cooling chamber.

Other embodiments of the present invention include a longitudinally extending second sidewall film cooling chamber positioned between one of the sidewall sections and a second inner wall bounding the cooling circuit. The second inner wall has a corresponding second wall angle with respect to the centerline and the second wall angle is substantially constant in the longitudinal direction from the base to the tip. A plurality of second impingement cooling apertures extend from a second one of the circuit channels through the second inner wall to the second sidewall film cooling chamber and the first and second inner walls are parallel to each other. The first and second sidewall film cooling chambers may both be triangular in cross-section. Another embodiment may be conducted with no impingement cooling apertures extending through the first and second inner walls and have a metering inlet at a radially inner base of the airfoil for supplying all cooling air to the first and second sidewall film cooling chambers.

ADVANTAGES OF THE INVENTION

The present invention allows an airfoil core for a turbine blade or vane having sidewall film cooling chambers, fed by a cooling circuit or through a base of the airfoil, to be manufactured in one piece, thereby, reducing the cost of labor, materials, handling damage, and casting fallout common to the assembly of multi-piece core systems. The blade can also be configured to deliver coolant at desirable pressures to match surface external boundary conditions along the pressure sidewall of the airfoil of blade.

The embodiments incorporating the sidewall film cooling chambers fed through the base of the airfoil chambers (in parallel flow arrangement with the circuit) may be configured for high speed coolant flow near the airfoil surface in the film cooling chambers to take advantage of coriolis acceleration augmented convection. In the embodiments incorporating the sidewall film cooling chambers fed by the cooling circuit (in serial flow arrangement with the circuit) high speed coolant flow near the airfoil surface provides desirable film pressure without the complexity of added internal cast holes that exhaust cooling air for film cooling.

The present invention also thermally shields the circuit for delivering cooling air for leading edge cooling and provides improved impingement cooling of the airfoil's pressure side inner concave surface. Cooling air supplied to the leading edge is thermally protected from heatup by the chordwise oriented walls between the widthwise internal ribs between the circuit and the film cooling chambers. Cooling air is supplied to the leading edge at a smaller pressure drop from the blade supply, than state of the art circuits, due to the reduced use in airfoil mid-section cooling, due in part to the highly effective impingement cooling of the airfoil pressure sidewall inner surface.

The spacing and sizing of the metering hole array, which also provide impingement cooling, better matches internal convective cooling with the external heat loading and allows film cooling film hole supply pressure inside the chambers to be tailored to external film hole exhaust pressure, thus, providing improved control of backflow margin. The spanwise separation or compartmentalization of the chambers also provides additional backflow margin and film cooling control. The compartmentalized chambers with horizontal ribs, provide improved control of backflow margin, blowing ratios, and film cooling.

The present invention provides advantages that include a significant improvement in the cooling of a mid-chord portion of the pressure sidewall section of the outer wall of a hollow gas turbine airfoil using less cooling air than would otherwise be necessary, while still providing sufficient cooling for the airfoil tip and acceptable airfoil tip metal temperatures. The film cooling chambers offers additional cooling capabilities that are more efficient and, therefore, less total cooling air is required and less film cooling is required. The airfoil cooling can be better tailored for conductive and convective cooling of portions of the sides of the outer wall closer to the leading edge and film cooling holes may be used for portions of the sides closer to the trailing edge where they will have smaller and, therefore, better blowing ratios and result in a better film cooling effectiveness and overall cooling efficiency.

Other advantages include increased coolant side heat transfer coefficient and improved metering capability for external film flow. The improved cooling also provides for cooler air to be discharged through the tip cooling holes providing improved cooling for the squealer tip.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
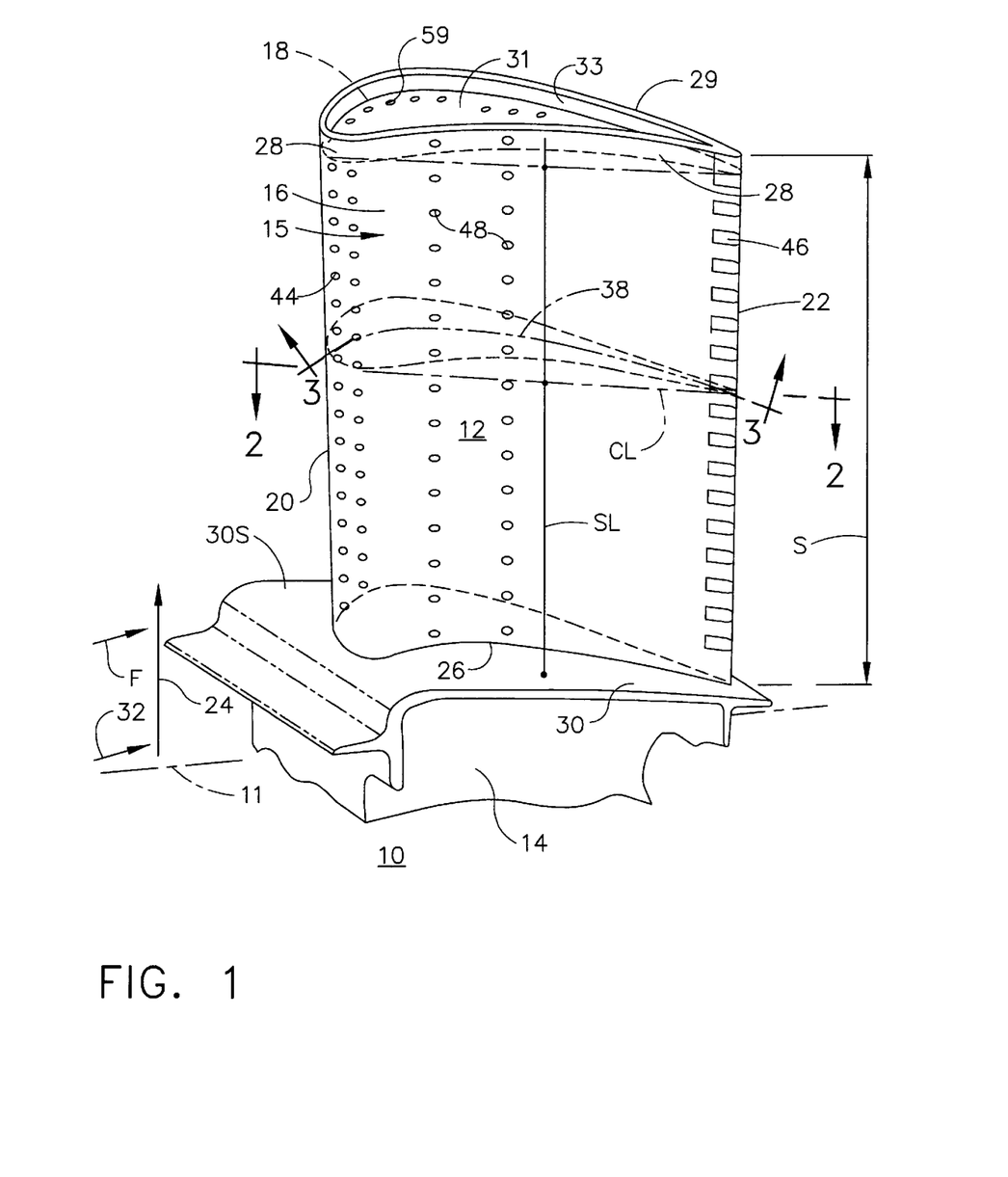
FIG. 1 is a perspective illustrative view of a gas turbine engine turbine rotor blade which incorporates a straight airfoil in accordance with a first exemplary embodiment of the invention.

Illustrated in FIG. 1 is an exemplary turbine blade 10 for a gas turbine engine designed to be operated in a hot gas stream that flows in an axial flow downstream direction F. The blade 10 includes a straight hollow airfoil 12 and a conventional root 14 used to secure the blade 10 to a rotor disk (not shown) of the engine which is circumscribed about an engine centerline 11. The airfoil 12 includes an outer wall 15 extending longitudinally in a radial direction 24 away from the engine centerline 11 in a spanwise direction of the airfoil 12 from a radially inner base 26 to a radially outer airfoil tip 28 along a span S of the airfoil. The inner base 26 is defined at a conventional platform 30 which forms the inner flow boundary of the blade 10 and below which extends the root 14.

The airfoil tip 28 is illustrated as a squealer tip having an outward extension from the outer wall 15 or a squealer wall 29 extending longitudinally outward from and peripherally around an outer tip wall 31 forming a squealer tip cavity 33 therein. Tip cooling holes 59 extending through the outer tip wall 31 from within the hollow airfoil 12 to the squealer tip cavity 33 are used to cool the tip cavity. Other non-squealer tips may be used. Although an exemplary gas turbine rotor blade 10 is illustrated in the FIGS., the invention applies equally as well to turbine stator vanes having similar airfoils which may be similarly cooled in accordance with the present invention.

Figure 2:
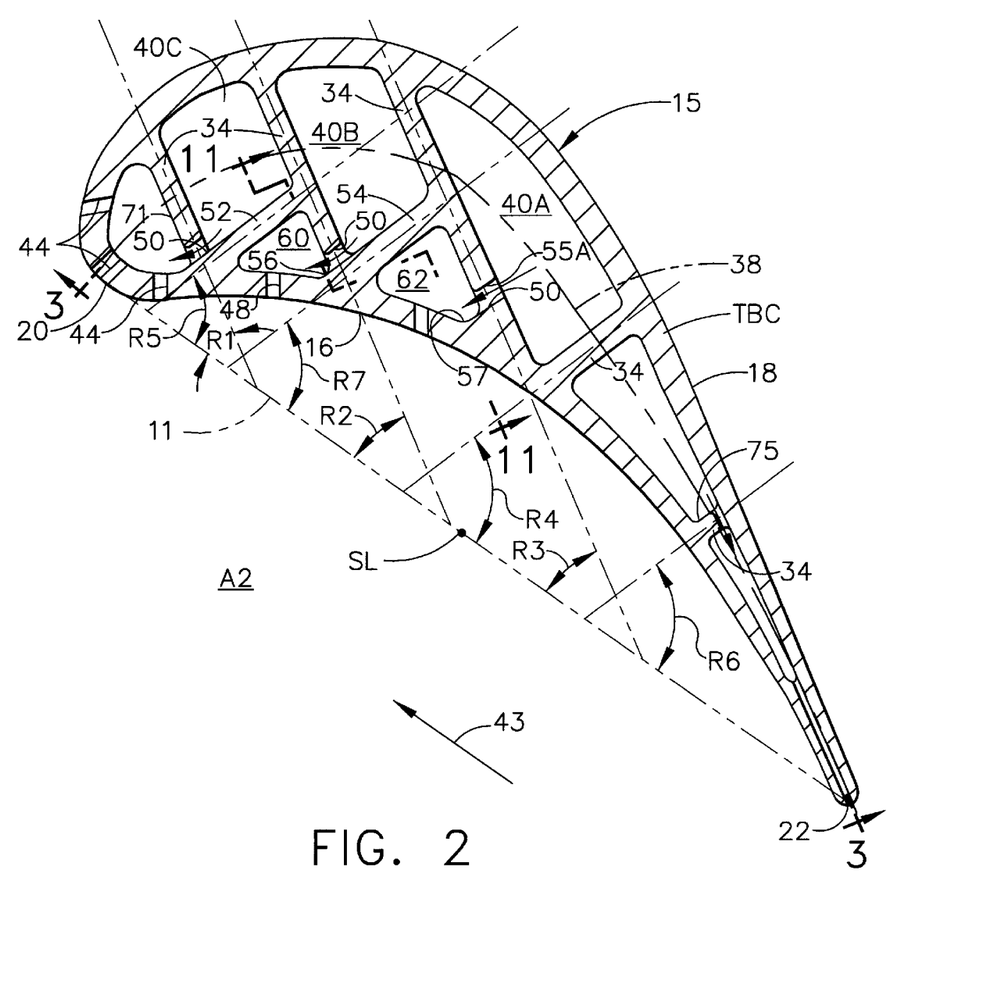
FIG. 2 is a sectional schematic illustration of an airfoil mid-span cross-section through line 2—2 of the airfoil in FIG. 1.

FIG. 2 illustrates a cross-section A taken through a mid-span location denoted by line 2—2 of the airfoil 12 which, together with FIG. 1, illustrates the outer wall 15 with a convex or pressure sidewall section 16 and a concave or suction sidewall section 18 chordally extending between an upstream leading edge 20 and a downstream trailing edge 22 which is spaced chordally apart from the leading edge. The pressure and suction sidewall sections 16 and 18, respectively, are spaced circumferentially or laterally apart from each other between the leading and trailing edges 20, 22 and are integrally joined together by a plurality of internal transverse ribs indicated generally at 34 which extend between the pressure and suction sidewall sections 16 and 18, respectively.

Figure 3:
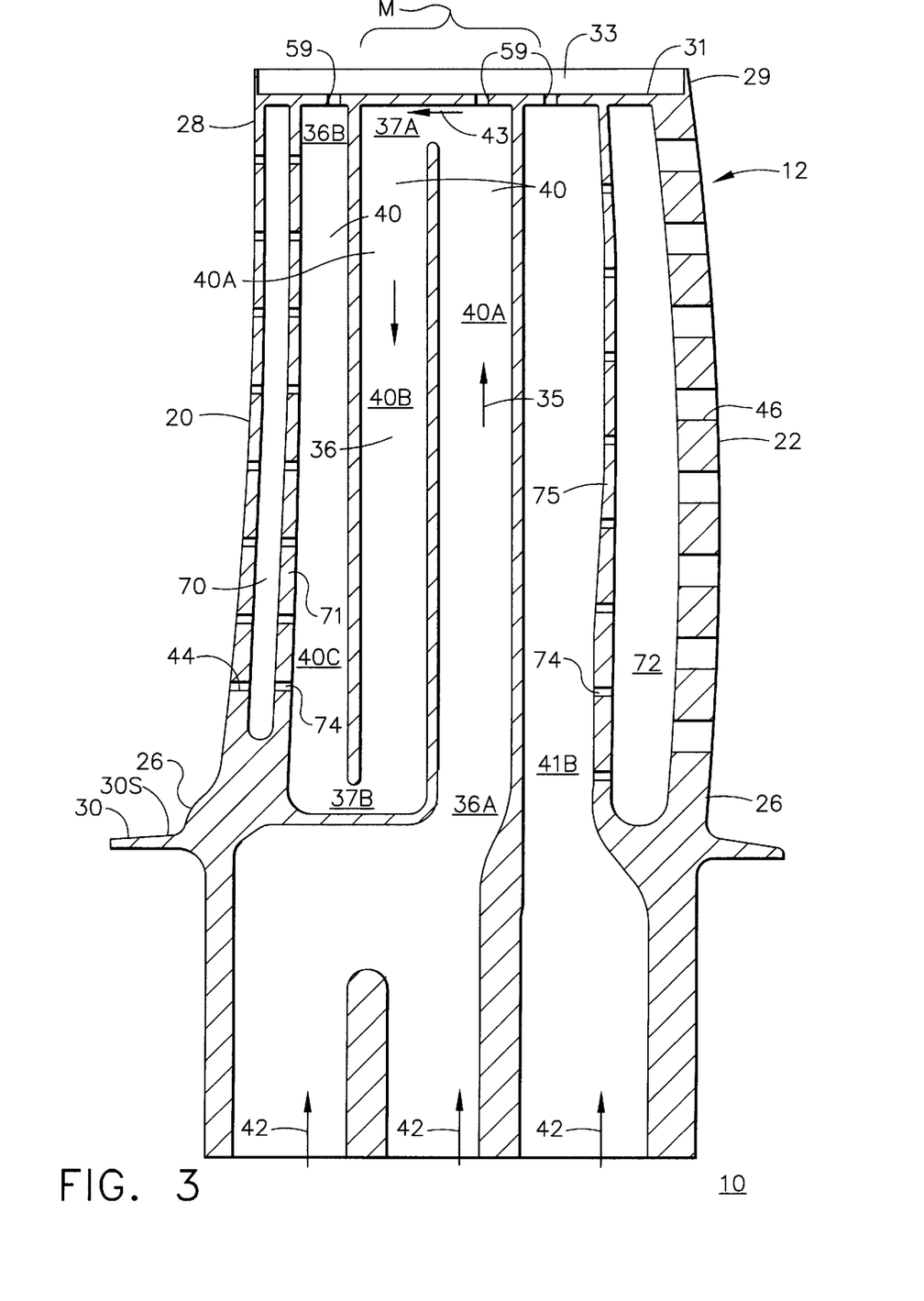
FIG. 3 is a sectional illustration through the blade in FIG. 1 which is laid out flat along a midline through a serpentine cooling circuit therein.

FIG. 3, taken through 3—3 in FIGS. 1 and 2, illustrates the airfoil 12 laid out flat along a cooling circuit split-line 38 that passes through the serpentine cooling circuit 36. At least some of the transverse ribs 34 define at least one set of cooling passages, herein exemplified by the serpentine cooling circuit 36. The serpentine cooling circuit 36 includes longitudinally extending serpentine channels 40 separated by the chordally spaced apart internal ribs 34 as illustrated in FIGS. 2 and 3. The exemplary embodiments herein illustrate a three pass serpentine cooling circuit 36 having three longitudinally extending serpentine channels 40 bounded by four chordally spaced apart internal ribs 34, however, more serpentine channels or passes may be used which is illustrated as a forward flowing serpentine cooling circuit. Other types of cooling circuits having longitudinally extending channels may also be used and the cooling circuit is not limited to the serpentine type.

The exemplary serpentine cooling circuit 36 is constructed so as to cause a serpentine cooling flow 35 within the cooling circuit 36 to flow in a chordal flow direction 43 forward from the trailing edge 22 to the leading edge 20 within the cooling circuit 36. The cooling circuit 36 includes an entrance 36A positioned aft of a terminal end 36B to cause the serpentine cooling flow 35 to flow in the chordal flow direction 43 forward from the trailing edge 22 to the leading edge 20.

One of the serpentine channels 40 which serves as an inlet channel 40A extending radially upwardly to a radially outer first turning channel 37A. The next serpentine channel is an intermediate channel 40B which directs cooling air radially inward to a radially inner second turning channel 37B which in turn feeds a third serpentine channel which serves as an end channel 40C extending radially upwardly to a terminal at the outer tip wall 31.

The hollow airfoil 12 has longitudinally extending first and second sidewall film cooling chambers 60 and 62, respectively, positioned between the pressure sidewall section 16 and first and second inner walls 52 and 54, respectively, that bound the end channel 40C and the intermediate channel 40B, respectively, of the serpentine cooling circuit 36. The first and second inner walls 52 and 54, respectively, generally extend between adjacent ones of the transverse ribs 34. The first and second sidewall film cooling chambers 60 and 62, respectively, are preferably triangular in cross-section as illustrated in FIG. 2.

In the first embodiment of the present invention, the first and second sidewall film cooling chambers 60 and 62, respectively, serve as impingement chambers. Cooling air 42 is introduced into the first and second sidewall film cooling chambers 60 and 62, respectively, from the serpentine cooling flow 35 in the serpentine cooling circuit 36 by metering holes 50 in the internal ribs 34. The metering holes 50 provide enhanced impingement cooling of the pressure sidewall section 16 along the first and second sidewall film cooling chambers 60 and 62, respectively. A first longitudinally extending linear array 55A (as illustrated more particularly in FIG. 11) of metering holes 50 extend from the intermediate channel 40B through one of the internal ribs 34 to the first film cooling chamber 60 at a first interior corner 56 of the first film cooling chamber. Note that in this embodiment the metering holes 50 are semi-circular to allow the use of single pull dies discussed further herein. A second longitudinally extending linear array 55B of metering holes 50 extend from the inlet channel 40A through another one of the internal ribs 34 to the second sidewall film cooling chamber 62 at a second interior corner 57 of the second film cooling chamber. The metering holes 50 independently meter a suitable amount of the cooling air 42 for accommodating the heat input loads along the first and second sidewall film cooling chambers 60 and 62, respectively.

The first and second sidewall film cooling chambers 60 and 62, respectively, extend radially inward to the base 26 of the airfoil 12 and extend radially outward and terminate at the outer tip wall 31. In a more particular embodiment (not illustrated herein) the first and second sidewall film cooling chambers 60 and 62, respectively, may extend radially inward to just below a radially outer platform surface 30S of the platform 30. At least one of the tip cooling holes 59 in the outer tip wall 31 extends from each of the first and second sidewall film cooling chambers 60 and 62, respectively, through the outer tip wall 31. The use of tip cooling holes in the outer tip wall, and particularly of squealer tips of airfoils, is well known. The placement of the tip cooling holes 59 in the radially outer ends of the first and second sidewall film cooling chambers 60 and 62, respectively, permits better control and metering of cooling air to the squealer type airfoil tip 28.

A leading edge cooling plenum 70 is formed between a forwardmost span rib 71 (also referred to as a leading edge bridge) and the leading edge 20 of the outer wall 15. A trailing edge cooling plenum 72 is formed between an aftwardmost span rib 75 and the trailing edge 22 of the outer wall 15. Cooling air discharge apertures 74 in the forwardmost span rib 71 feeds cooling air from the end channel 40C to the leading edge cooling plenum 70 from where it is flowed through conventional leading edge film cooling or shower head cooling holes 44. Cooling air discharge apertures 74, which are preferably designed to provide impingement cooling of the trailing edge 22, are disposed in the aftwardmost span rib 75 and feed cooling air from an aft feed channel 41B to the trailing edge cooling plenum 72. The cooling air from the aft feed channel 41B is flowed through conventional trailing edge cooling apertures, preferably in the form of cooling slots 46, as illustrated in FIG. 3. This is used to cool the leading and trailing edges 20 and 22, respectively.

The airfoil squealer tip is cooled by tip cooling hole 59 in the outer tip wall 31 at locations which lead out from the end channel 40C, from the first and second sidewall film cooling chambers 60 and 62, respectively, and from the aft feed channel to the squealer tip cavity 33. The outer tip wall 31 also caps the outer most portions of the serpentine cooling circuit its channels, the film cooling chambers, and the plenums.

The airfoil includes film cooling holes 48 leading from the first and second sidewall film cooling chambers 60 and 62, respectively, through the pressure sidewall section 16 of the outer wall 15. The film cooling holes 48 are disposed through the outer wall 15 along a mid-chord portion M of the airfoil between the leading and trailing edges 20 and 22, respectively. The film cooling holes 48 are preferably compound angled downstream and radially outward with respect to the engine centerline 11. According to another more specific embodiment the airfoil 12 may be constructed with film cooling holes only in the pressure sidewall section 16 and no film cooling holes in the suction sidewall section 18.

The airfoil 12 may have any other conventional features for enhancing the cooling thereof such as turbulators or pins (not shown) which are well known in the art. Thermal barrier coatings TBC, well known in the technology, may also be used to improve thermal characteristics of the airfoil 12.

Figure 4:
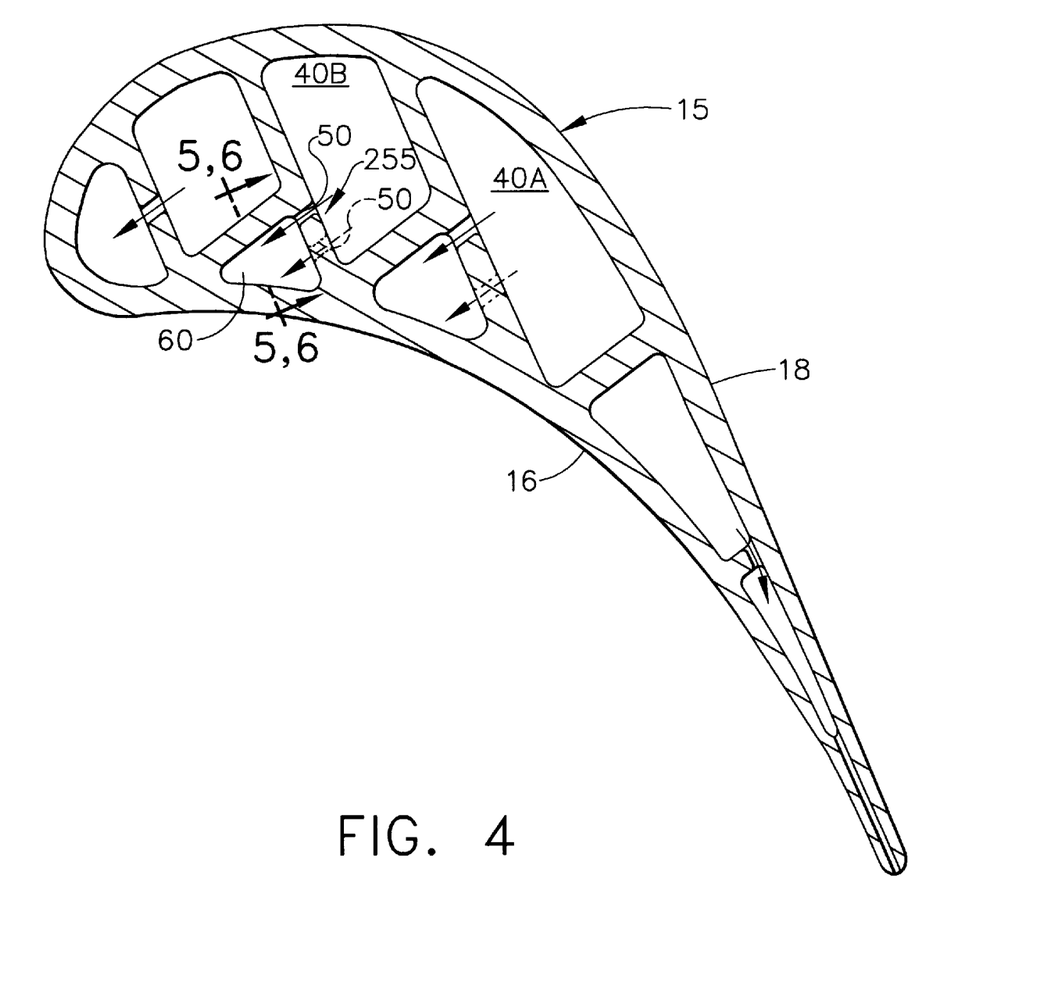
FIG. 4 is a sectional schematic illustration of the airfoil mid-span cross-section through line 2—2 of the airfoil in FIG. 1 with an alternative array of metering holes.

The first and second inner walls 52 and 54, respectively, the forwardmost and aftwardmost span ribs 71 and 75, respectively, and the other transverse ribs 34 are cast monolithically with the outer wall 15. Another feature of the preferred embodiment of the present invention is to have all the inner walls and ribs constructed each with a constant angle with respect to the centerline 11 along their entire spanwise lengths. This feature is illustrated in FIGS. 2, 3, and 4, wherein the first and second inner walls 52 and 54 are held at acute constant fifth and seventh rib angles R5 and R7, respectively, with respect to the centerline 11, the forwardmost and aftwardmost span ribs 71 and 75, respectively, are held at acute constant rib first and sixth rib angles R1 and R6, respectively, with respect to the centerline 11, and the remaining three transverse ribs 34 are held at constant rib second, third, and fourth rib angles R2, R3, and R4 in downstream succession respectively with respect to the centerline 11. The monolithic casting of the inner walls and ribs of the airfoil 12 is designed to reduce the cost and complexity of casting the airfoil 12. These features also allow a single piece core to be made from a mold assembly. This constant rib angles feature is for straight and twisted airfoils (illustrated more particularly in FIGS. 7, 8, 9, and 10) and for airfoils curved in the axial and/or circumferential direction such that a stacking line is curved in the axial and/or circumferential direction.

Another feature of the present invention is that the first and second inner walls 52 and 54, respectively, are substantially parallel to each other and all the transverse ribs 34 are substantially parallel to each other or are substantially parallel to the first and second inner walls. Other embodiments of the present invention include different numbers of internal transverse ribs, sidewall film cooling chambers, and inner walls between the film cooling chambers and cooling passages of the cooling circuit. In each of these embodiments, all the inner walls are substantially parallel to each other and all the transverse ribs are substantially parallel to each other or are substantially parallel to the first and second inner walls. This allows for the use of only two dies surrounding the airfoil and a single pull required to release the core. It also allows for the use of a single piece core to improve the quality and accuracy of the casting process and internal passages and impingement chambers and leading and trailing edge cooling plenums of the hollow airfoil.

Figure 5:
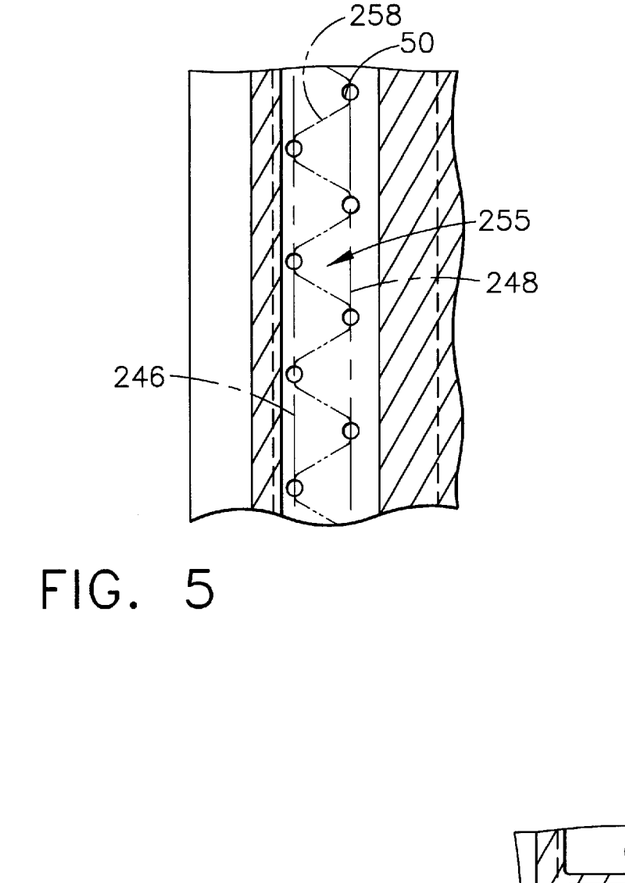
FIG. 5 is an illustration of the alternative array of metering holes as viewed along line 5—5 of the airfoil in FIG. 4.

FIGS. 4 and 5 illustrate an alternative array 255 of metering holes 50 extending from the intermediate channel 40B through one of the internal ribs 34. The alternative array 255 has longitudinally extending linearly aligned first and second rows 246 and 248, respectively, of the metering holes 5C along its corresponding internal rib 34. The metering holes 50 in the first row 246 are linearly staggered with respect to the metering holes in the second row such that all of the metering holes are centered along a single zig-zag line 258. The same type of alternative array 255 of metering holes 50 extend from the inlet channel 40A through another one of the internal ribs 34 to the second sidewall film cooling chamber 62. This alternate configuration for the arrays permits the use of only two dies with sliders surrounding the airfoil core, a single pull to release the core, and for the use of a single piece core.

Figure 6:
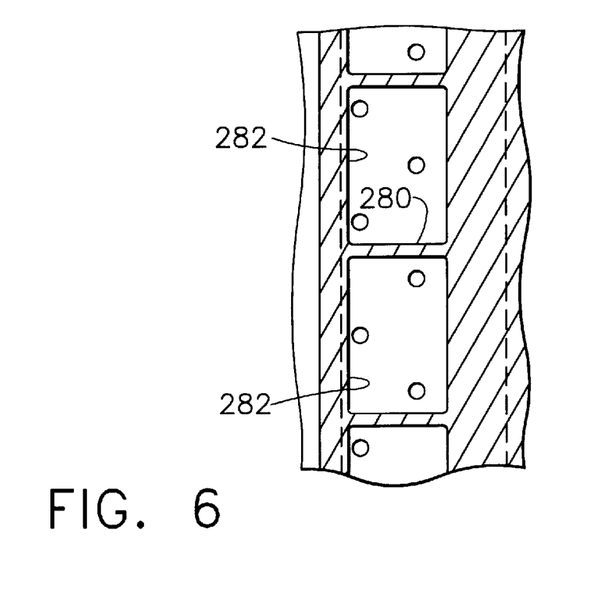
FIG. 6 is an illustration of a compartmentalized film cooling chamber in FIG. 1 as viewed along line 6—6 of the airfoil in FIG. 4.
Figure 7:
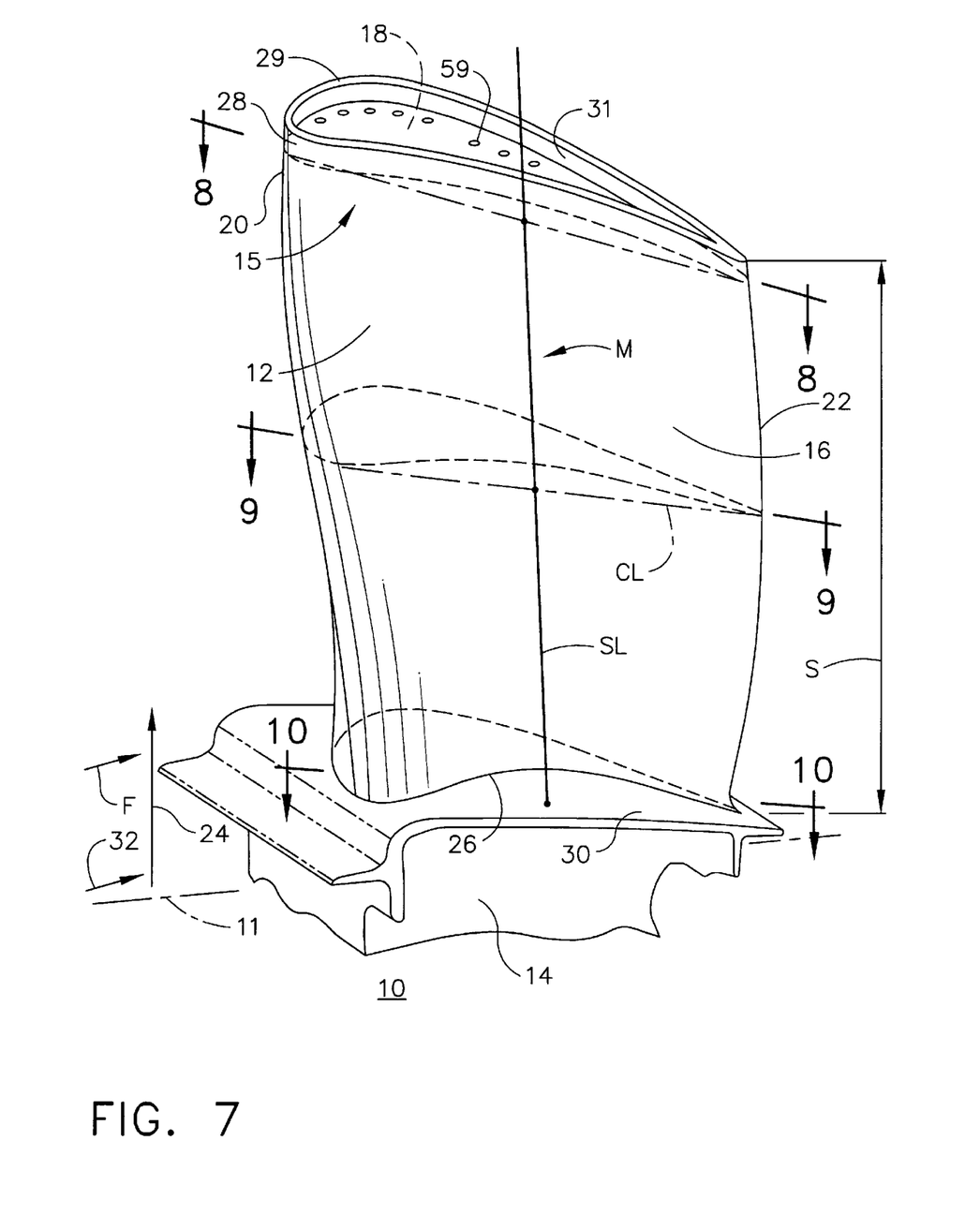
FIG. 7 is a perspective view of a gas turbine engine turbine rotor blade which incorporates a twisted airfoil in accordance with a second exemplary embodiment of the invention.

FIG. 6 illustrates yet another alternative feature of the present invention. Shelves 280 extend cross-sectionally entirely across the first and second sidewall film cooling chambers 60 and 62, respectively, forming compartments 282 within the chambers. This permits a more tailored metered cooling scheme for both impingement cooling and sidewall film cooling. The pressure maintained in the different compartments may be different. The shelves are also integrally or monolithically cast with the transverse ribs 34, the first and second inner walls 52 and 54, respectively, and the outer wall 15. The same type of alternative arrays of metering holes discussed above may be used. This alternate configuration for the arrays permits the use of only two dies with sliders surrounding the airfoil core, a single pull to release the core, and for the use of a single piece core.

Figure 8:
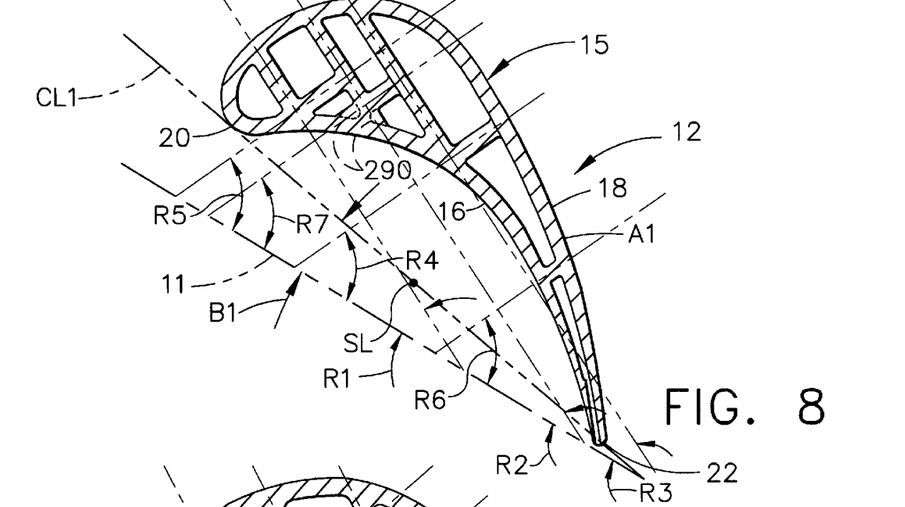
FIG. 8 is a sectional schematic illustration of an airfoil tip cross-section through line 8—8 of the airfoil in FIG. 7.
Figures 9, 10:
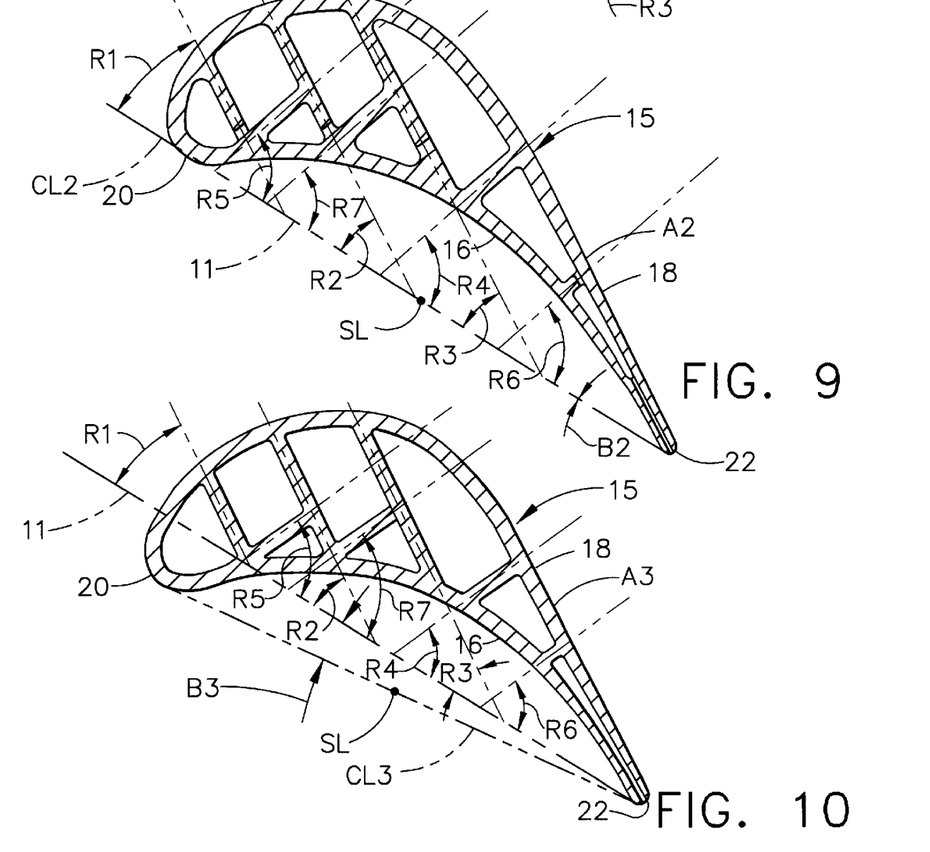
FIG. 9 is a sectional schematic illustration of an airfoil mid-span cross-section through line 9—9 of the airfoil in FIG. 7.
FIG. 10 is a sectional schematic illustration of an air oil base cross-section through line 10—10 of the airfoil in FIG. 7.

The present invention also provides for a twisted airfoil 12 as illustrated in FIGS. 7, 8, 9, and 10. The airfoil 12 may have a moderate degree of twist about a stacking line SL as indicated by the variation of angle of first second and third chord lines CL1, CL2, and CL3, respectively, with respect to the engine centerline 11. FIGS. 8–10 illustrate first, second, and third airfoil cross-sections A1, A2, and A3 taken at tip, mid-span, and platform locations through lines 8—8, 9—9, and 10—10 respectively, in FIG. 7. The twist is also illustrated a chord angle which varies from a first chord angle B1 at the tip 28 through a second chord angle B2 (equal to 0 degrees in the FIGS.) at the mid-span location to a third chord angle B3 at the platform 30. The first, second, and third chord angles B1–B3 are defined as the corresponding angle between the first, second, or third, chord line CL1–CL3, respectively, that extend from the leading edge 20 to the trailing edge 22, with respect to the engine centerline 11. The different airfoil cross-sections A1–A3 of the twisted airfoil 12 are typically angled about the stacking line SL. The stacking line SL may be curved circumferentially as well as axially as may the leading and trailing edges 20 and 22, respectively. Modern day turbine airfoil also typically have a high degree of camber as illustrated by a mid-span camber line CL.

The first and second sidewall film cooling chambers 60 and 62, respectively, are preferably triangular in cross-section as illustrated in FIGS. 8–10. Note, that even though the airfoil cross-sections A1 and A3 may vary about ±10 degrees from the nominal cross-section A2 at the mid-span (indicated by first and second chord angles B1 and B2 respectively) the first and second inner walls 52 and 54, respectively, the forwardmost and aftwardmost span ribs 71 and 75, respectively, and the other transverse ribs 34 are cast monolithically with the outer wall 15. Furthermore, each of all the inner walls and ribs are constructed with a constant angle with respect to the centerline 11 along their entire spanwise lengths. The first and second inner walls 52 and 54 are held at acute constant fifth and seventh rib angles R5 and R7, respectively, with respect to the centerline 11, the forwardmost and aftwardmost span ribs 71 and 75 are held at acute constant rib first and sixth rib angles R1 and R6, respectively, with respect to the centerline 11, and the remaining three transverse ribs 34 are held at constant rib second, third, and fourth rib angles R2, R3, and R4 in downstream succession respectively with respect to the centerline 11. Because of these restrictions the triangular cross-sections of the first and second sidewall film cooling chambers 60 and 62, respectively, may be truncated near the airfoil tip 28 as illustrated by dotted lines outlining truncated portions 290 of the sidewall film cooling chambers.

Figure 11:
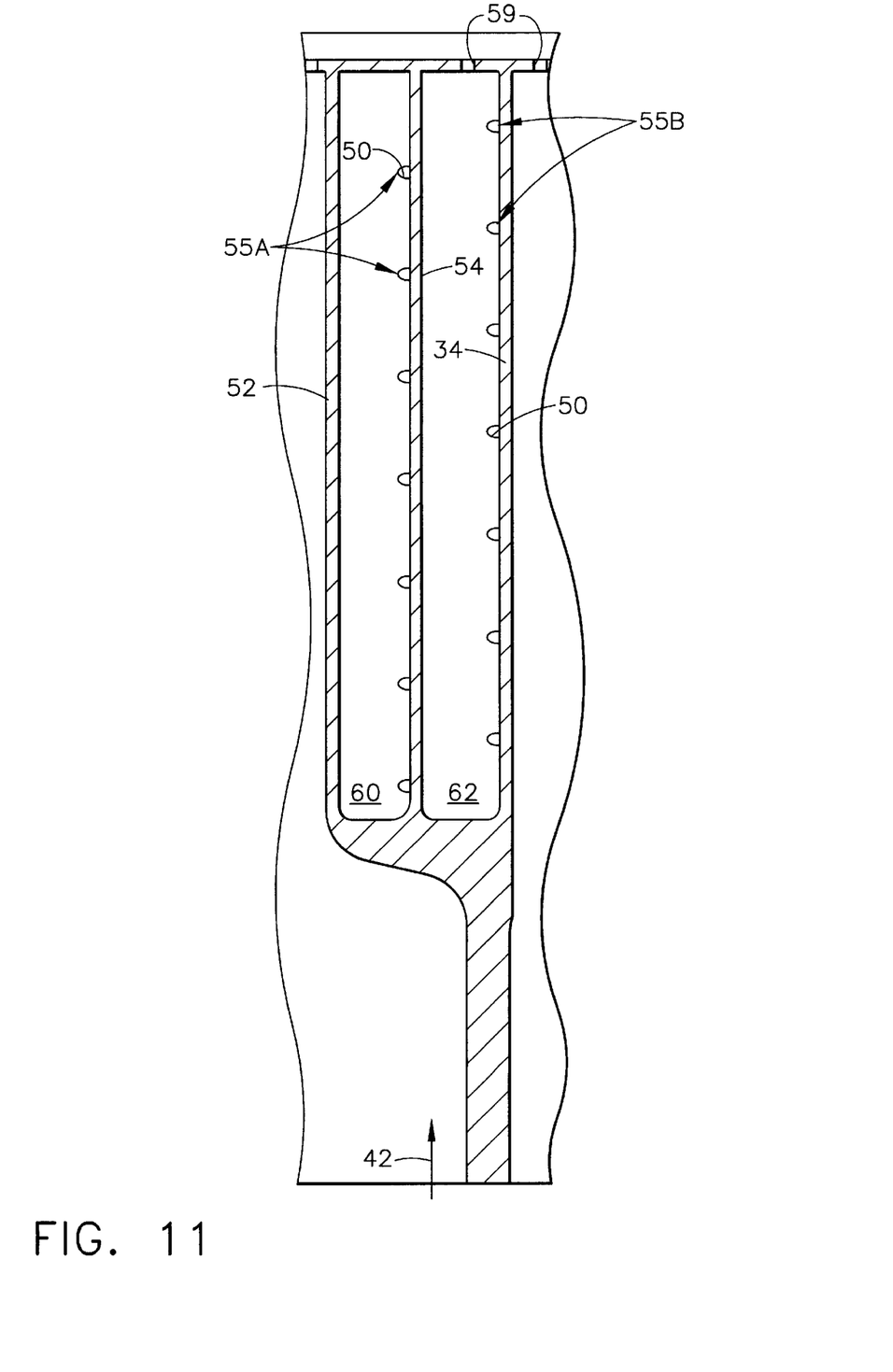
FIG. 11 is a sectional illustration as viewed along line 11—11 through the blade in FIG. 2 which is laid out flat along a mid-line through the film cooling chambers fed by the serpentine cooling circuit.
Figure 12:
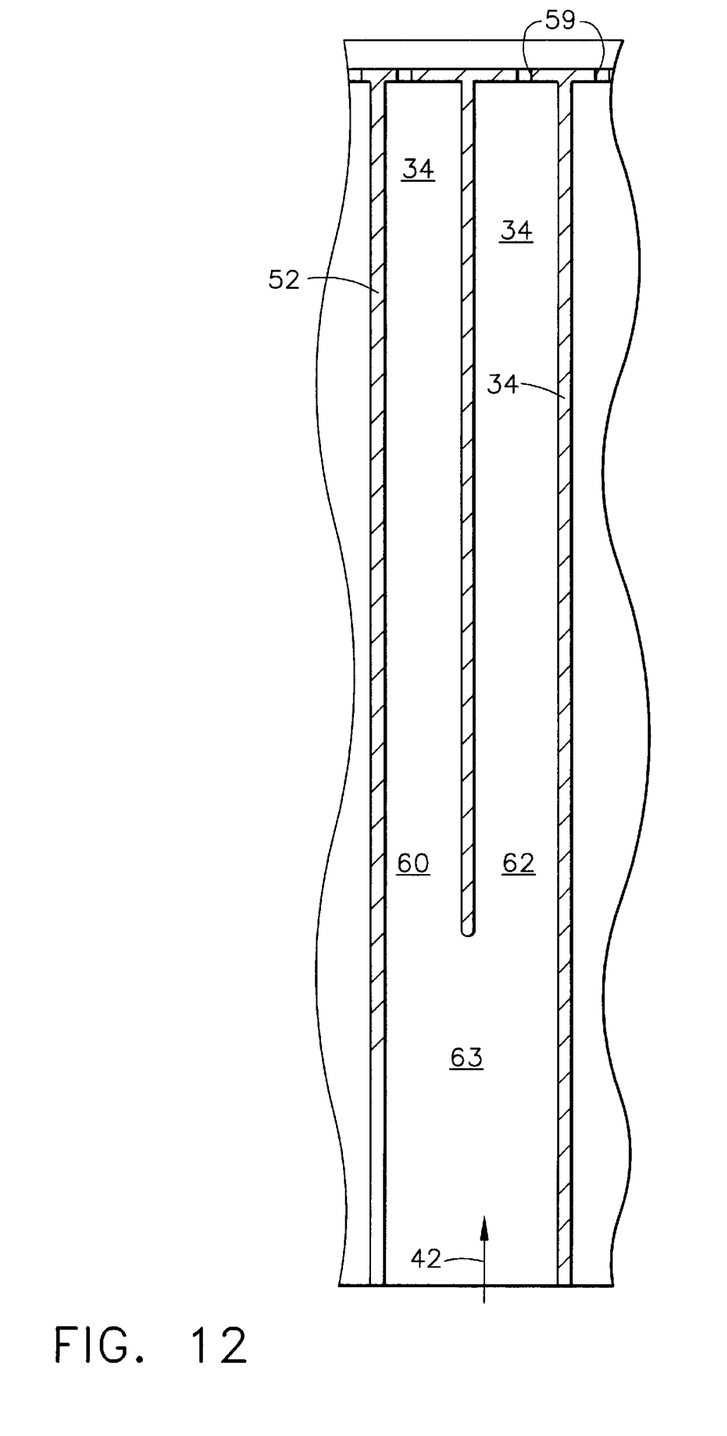
FIG. 12 is a sectional illustration as viewed along line 11—11 through the blade in FIG. 2 which is laid out flat along a mid-line through the film cooling chambers fed through the root of the blade.

Illustrated in FIG. 12 is another embodiment of the present invention in which the first and second sidewall film cooling chambers 60 and 62, respectively, have none of the metering holes 50 and no impingement cooling of the pressure sidewall section 16. All of the cooling air 42 supplied to the first and second sidewall film cooling chambers 60 and 62, respectively, is supplied from the root 14 through a metering inlet 63 at the radially inner base 26 of the airfoil 12. This is in contrast to embodiments in which the first and second sidewall film cooling chambers 60 and 62, serve as impingement chambers as illustrated in FIG. 11 where the metering holes 50 are used to provide all of the cooling air 42 into the chambers and no cooling air is supplied from the root 14 through the radially inner base 26 of the airfoil 12.

Although the invention has been described with respect to the exemplary turbine blade 10 illustrated in the FIGS., it may also be used for turbine nozzle vanes which have similar airfoils which can benefit from preferential spanwise cooling thereof for better matching the radial applied temperature distribution from the combustion gases 32. The serpentine cooling circuit 36 and the first and second sidewall film cooling chambers 60 and 62, respectively, may be readily manufactured using conventional casting techniques as are used for conventional multi-pass serpentine passages.

Figure 13:
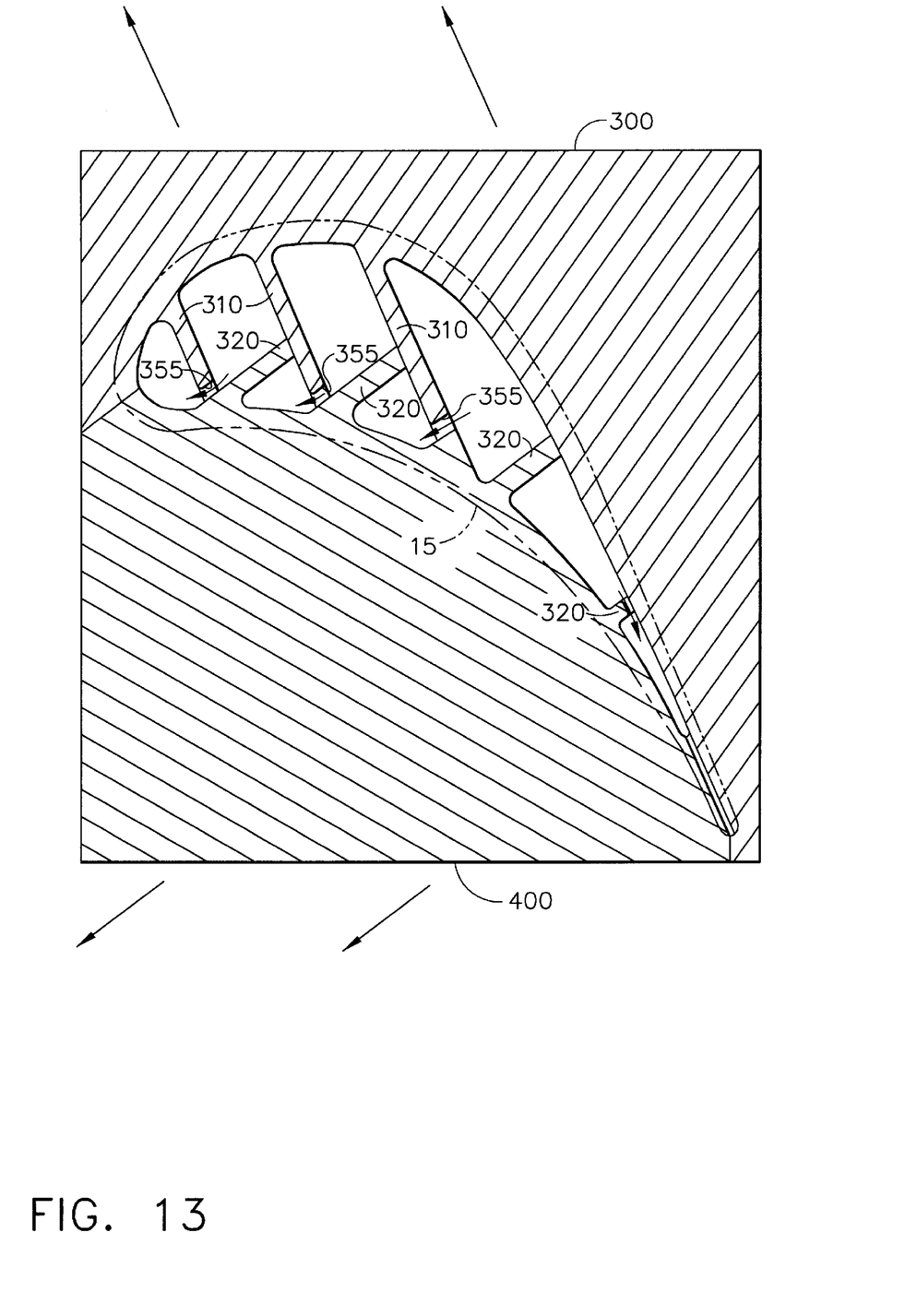
FIG. 13 is a sectional illustration of a first exemplary airfoil dies used to produce a core for casting blades in accordace with the present invention.

FIG. 13 illustrates a set of suction and pressure dies 300 and 400 respectively that may be used to cast a core that itself is used to cast the airfoil in accordance with the present invention. The airfoil's outer wall 15 is illustrated in dashed line. The suction die 300 as a first set of substantially parallel transverse ribs 310 extending towards the pressure die 400. The pressure die 400 has a second set of substantially parallel transverse ribs 320 extending towards suction die 300. Semi-circular notches 355 are disposed at ends of some of the first and second set of substantially parallel transverse ribs 310 and 320 respectively to form semi-circular pins in the core which are used to form the semi-circular metering holes 50 and the discharge apertures 74 in the airfoil 10 in FIGS. 2 and 3.

Figure 14:
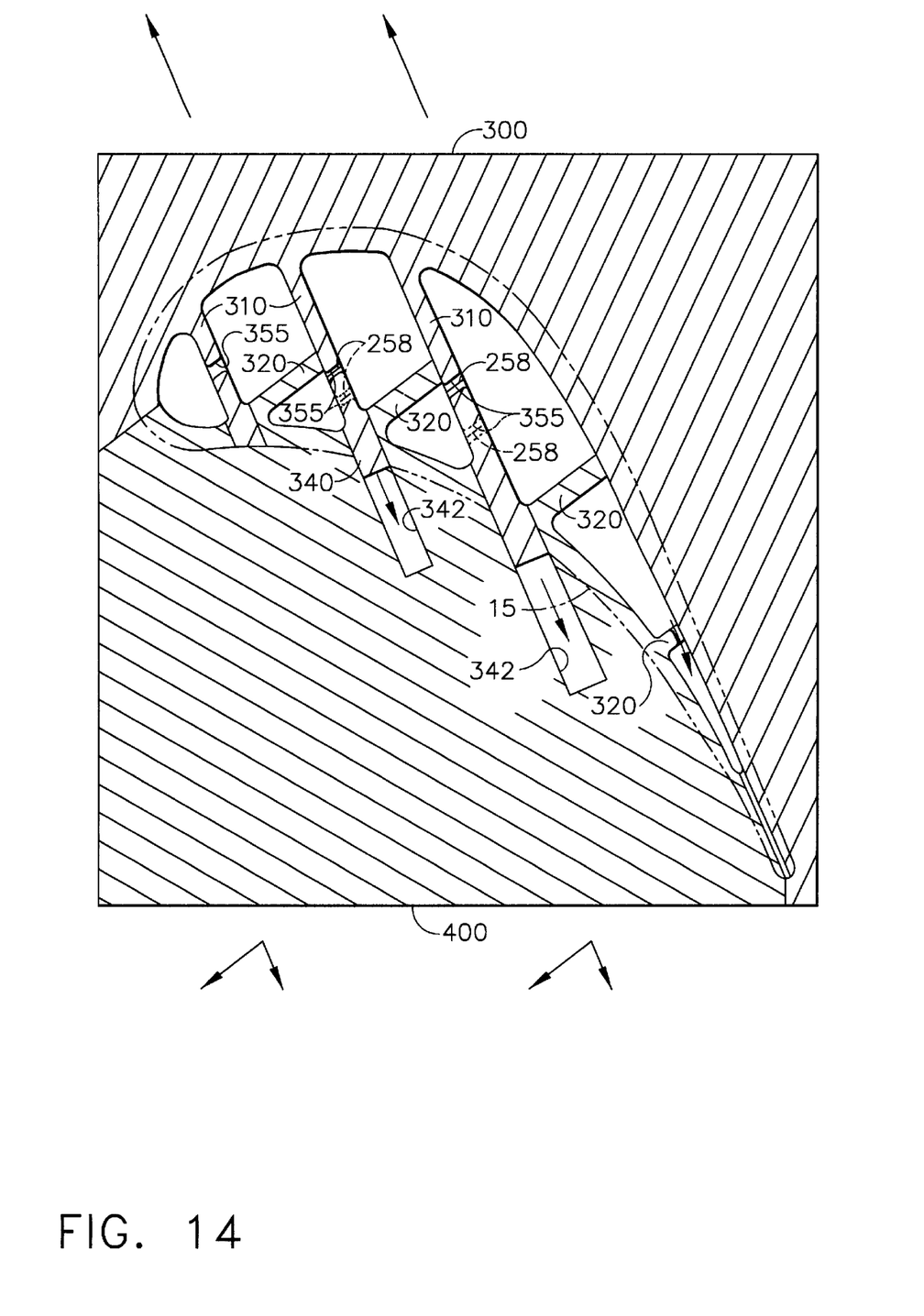
FIG. 14 is a sectional illustration of a second exemplary airfoil dies used to produce a core for casting blades in accordace with the present invention.

FIG. 14 illustrates an alternative set of suction and pressure dies 300 and 400 respectively that may be used to cast a core that itself is used to cast the airfoil in accordance with the airfoil 10 illustrated in FIGS. 4 and 5. The airfoil's outer wall 15 is illustrated in dashed line. The suction die 300 has the first set of substantially parallel transverse ribs 310 extending towards the pressure die 400. The pressure die 400 has the second set of substantially parallel transverse ribs 320 extending towards suction die 400. Sliders 340, designed to be recessed into die slots 342, are used to form sets of cylindrical pins in the core which are used to form cylindrical metering holes 50. Mating semi-circular notches 355 are disposed at contacting ends of some of the first set of substantially parallel transverse ribs 310 and the sliders. The mating notches are linearly aligned in firs. and second rows and are centered along a single zig-zag line 258 as indicated in FIG. 5 of the airfoil.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

1. A gas turbine engine airfoil circumscribed about an engine centerline, said airfoils comprising:
    an airfoil outer wall having widthwise spaced apart pressure and suction sidewall sections extending chordally between leading and trailing edges of said airfoil and extending longitudinally from a base to a tip in a radially outwardly direction from said centerline;
    at least one internal cooling circuit having a plurality of longitudinally extending circuit channels between longitudinally extending internal ribs extending widthwise between said pressure and suction sidewall sections;
    a longitudinally extending first sidewall film cooling chamber positioned between one of said sidewall sections, a first one of said internal ribs, and a first inner wall bounding said cooling circuit and a first plurality of sidewall film cooling holes extend through said pressure sidewall section from said first sidewall film cooling chamber;
    said internal ribs having corresponding rib angles with respect to said centerline,
    said first inner wall having a corresponding first wall angle with respect to said centerline,
    each of said rib angles and said first wall angle being constant in a longitudinal direction from said base to said tip, and
    a plurality of first impingement cooling apertures extending from a first one of said circuit channels through said first one of said internal ribs to said first sidewall film cooling chamber.

2. An airfoil as claimed in claim 1 having two sets of said internal ribs wherein said internal ribs in a first set are substantially parallel to each other and said internal ribs in a second set are substantially parallel to said first inner wall.

3. An airfoil as claimed in claim 2 wherein said first sidewall film cooling chamber is triangular in cross-section.

4. An airfoil as claimed in claim 3 wherein said first impingement cooling apertures are located along an interior corner of said first sidewall film cooling chamber.

5. An airfoil as claimed in claim 4 wherein said one of said sidewall sections is said pressure sidewall section.

6. An airfoil as claimed in claim 5 wherein said internal cooling circuit is a serpentine cooling circuit.

7. An airfoil as claimed in claim 6 wherein said first sidewall film cooling chamber segmented into compartments with shelves extending cross-sectionally entirely across said first sidewall film cooling chamber between each of said compartments.

8. An airfoil as claimed in claim 3 wherein said first impingement cooling apertures are arranged in a staggered array in at least two longitudinally extending rows such that said first impingement cooling apertures are centered along a single zig-zag line.

9. An airfoil as claimed in claim 8 wherein said one of said sidewall sections is said pressure sidewall section and said internal cooling circuit is a serpentine cooling circuit.

10. An airfoil as claimed in claim 3 wherein said first sidewall film cooling chamber segmented into compartments with shelves extending cross-sectionally entirely across said first sidewall film cooling chamber between each of said compartments.

11. An airfoil as claimed in claim 2 wherein said internal cooling circuit is a serpentine cooling circuit.

12. An airfoil as claimed in claim 2 further comprising:
    a longitudinally extending second sidewall film cooling chamber positioned between said one of said sidewall sections, a second one of said internal ribs, and a second inner wall bounding said cooling circuit,
    said second inner wall having a corresponding second wall angle with respect to said centerline and said second wall angle being substantially constant in said longitudinal direction from said base to said tip,
    a plurality of second impingement cooling apertures extending from a second one of said circuit channels through said second one of said internal ribs to said second sidewall film cooling chamber, and
    said first and second inner walls being parallel to each other.

13. An airfoil as claimed in claim 12 wherein said first and second sidewall film cooling chambers are triangular in cross-section.

14. An airfoil as claimed in claim 13 wherein each of said first and second impingement pluralities of cooling apertures are arranged staggered arrays in at least two longitudinally extending rows such that said first impingement cooling apertures are centered along a single zig-zag line, said one of said sidewall sections is said pressure sidewall section and first and second pluralities of sidewall film cooling holes extend through said pressure sidewall section from said first and second sidewall film cooling chambers respectively, and said internal cooling circuit is a serpentine cooling circuit.

15. An airfoil as claimed in claim 14 wherein said first sidewall film cooling chamber segmented into compartments with shelves extending cross-sectionally entirely across said first sidewall film cooling chamber between each of said compartments.

16. An airfoil as claimed in claim 14 wherein said first and second impingement cooling apertures are located along interior corners of said first and second sidewall film cooling chambers.

17. An airfoil as claimed in claim 16 wherein said one of said sidewall sections is said pressure sidewall section and first and second pluralities of sidewall film cooling holes extend through said pressure sidewall section from said first and second sidewall film cooling chambers respectively.

18. An airfoil as claimed in claim 17 wherein said internal cooling circuit is a serpentine cooling circuit.

19. An airfoil as claimed in claim 16 further comprising:
    leading edge and trailing edge cooling plenums along said leading and trailing edges,
    said leading edge and trailing edge cooling plenums having cooling air discharge apertures in said outer wall along said leading edge and trailing edges respectively,
    said leading edge cooling plenum having leading edge feed apertures through a leading edge span rib of a forward feed channel located forward of said internal serpentine cooling circuit,
    a plurality of leading edge cooling apertures extend out of said leading edge cooling plenum through said outer wall around said leading edge,
    said trailing edge cooling plenum having trailing edge feed apertures through a trailing edge span rib of an aft feed channel located aft of said internal serpentine cooling circuit,
    a plurality of trailing edge cooling apertures extend out of said trailing edge cooling plenum through said outer wall at said trailing edge, and said leading and trailing edge span ribs have corresponding span rib angles with respect to said centerline and each of said span rib angles is constant in a longitudinal direction from said base to said tip.

20. An airfoil as claimed in claim 19 further comprising:

an outer tip wall which caps said cooling circuit at said tip, a squealer tip having a squealer wall extending longitudinally outward from and peripherally around said outer tip wall forming a squealer tip cavity therein, at least one tip cooling hole extending out though said tip wall from each of said first and second sidewall film cooling chambers.

21. An airfoil as claimed in claim 1 further comprising:

two sets of said internal ribs wherein said internal ribs in a first set are substantially parallel to each other and said internal ribs in a second set are substantially parallel to said first inner wall, said first sidewall film cooling chamber being triangular in cross-section, and a metering inlet at a radially inner base of said airfoil for supplying all cooling air to said first sidewall film cooling chamber.

22. An airfoil as claimed in claim 1 further comprising:

a longitudinally extending second sidewall film cooling chamber positioned between said one of said sidewall sections and a second inner wall bounding said cooling circuit, said second inner wall having a corresponding second wall angle with respect to said centerline and said second wall angle being substantially constant in said longitudinal direction from said base to said tip, said first and second inner walls being parallel to each other, two sets of said internal ribs wherein said internal ribs in a first set are substantially parallel to each other and said internal ribs in a second set are substantially parallel to said first and second inner walls, said first and second sidewall film cooling chambers being triangular in cross-section, and a metering inlet at a radially inner base of said airfoil for supplying all cooling air to said first and second sidewall film cooling chambers.

23. A gas turbine engine airfoil circumscribed about an engine centerline, said airfoil comprising:

an airfoil outer wall having widthwise spaced apart pressure and suction sidewall sections extending chordally between leading and trailing edges of said airfoil and extending longitudinally from a base to a tip in a radially outwardly direction from said centerline;

at least one internal cooling circuit having a plurality of longitudinally extending circuit channels between longitudinally extending internal ribs extending widthwise between said pressure and suction sidewall sections;

a longitudinally extending first sidewall film cooling chamber positioned between one of said sidewall sections, a first one of said internal ribs, and a first inner wall bounding said cooling circuit and a first plurality of sidewall film cooling holes extend through said pressure sidewall section from said first sidewall film cooling chamber;

said internal ribs having corresponding rib angles with respect to said centerline;

said first inner wall having a corresponding first wall angle with respect to said centerline;

each of said rib angles and said first wall angle being constant in a longitudinal direction from said base to said tip; and each of said ribs being parallel to another one of said ribs or said first inner wall.

24. An airfoil as claimed in claim 23 further comprising a plurality of first impingement cooling apertures extending from at least a first one of said circuit channels through said first one of said internal ribs to said internal cooling circuit.

25. An airfoil as claimed in claim 24 having two sets of said internal ribs wherein said internal ribs in a first set are substantially parallel to each other and said internal ribs in a second set are substantially parallel to said first inner wall.

26. An airfoil as claimed in claim 25 further comprising:

a longitudinally extending second sidewall film cooling chamber positioned between said one of said sidewall sections, a second one of said internal ribs, and a second inner wall bounding said cooling circuit, said second inner wall having a corresponding second wall angle with respect to said centerline and said second wall angle being substantially constant in said longitudinal direction from said base to said tip, a plurality of second impingement cooling apertures extending from a second one of said circuit channels through said second one of said internal ribs to said second sidewall film cooling chamber, and said first and second inner walls being parallel to each other.

27. An airfoil as claimed in claim 26 wherein said first and second sidewall film cooling chambers are triangular in cross-section.

28. An airfoil as claimed in claim 27 wherein said one of said sidewall sections is said pressure sidewall section and first and second pluralities of sidewall film cooling holes extend through said pressure sidewall section from said first and second sidewall film cooling chambers respectively.

29. An airfoil as claimed in claim 27 wherein each of said first and second impingement pluralities of cooling apertures are arranged staggered arrays in at least two longitudinally extending rows such that said first impingement cooling apertures are centered along a single zig-zag line, said one of said sidewall sections is said pressure sidewall section and first and second pluralities of sidewall film cooling holes extend through said pressure sidewall section from said first and second sidewall film cooling chambers respectively, and said internal cooling circuit is a serpentine cooling circuit.

30. An airfoil as claimed in claim 26 wherein said first and second impingement cooling apertures are located along interior corners of said first and second sidewall film cooling chambers.

\* \* \* \* \*